United States Patent [19]
Putze

[11] Patent Number: 6,085,948
[45] Date of Patent: Jul. 11, 2000

[54] TRAP CLOSURE DEVICE FOR TRAILER HOPPERS

[75] Inventor: Matthew M. Putze, Sioux City, Iowa

[73] Assignee: Wilson Trailer Company, Sioux City, Iowa

[21] Appl. No.: 09/097,702

[22] Filed: Jun. 16, 1998

[51] Int. Cl.[7] .................................................. B65D 47/00
[52] U.S. Cl. ........................................ 222/561; 222/504
[58] Field of Search .................................. 222/561, 559, 222/505, 504; 105/282.1; 251/278

[56] References Cited

U.S. PATENT DOCUMENTS

| | | | |
|---|---|---|---|
| 2,544,117 | 3/1951 | Weatherly | 298/30 |
| 2,690,352 | 9/1954 | Turner | 298/8 |
| 2,859,888 | 11/1958 | Fairnington | 214/311 |
| 3,241,730 | 3/1966 | Dorey | 222/561 |
| 3,262,610 | 7/1966 | Jordan | 222/559 |
| 3,433,178 | 3/1969 | Floehr | 105/282.1 |
| 3,826,203 | 7/1974 | Martin et al. | 105/282 P |
| 3,958,515 | 3/1976 | Goudy | 105/467 |
| 3,997,089 | 12/1976 | Clarke et al. | 222/545 |
| 4,055,265 | 10/1977 | Eisenman | 214/17 D |
| 4,193,159 | 3/1980 | Beard, III | 15/340 |
| 5,038,966 | 8/1991 | Olk | 222/561 X |

FOREIGN PATENT DOCUMENTS

| | | | |
|---|---|---|---|
| 2915-014 | 10/1980 | Germany | 222/561 |

Primary Examiner—Kevin Shaver
Assistant Examiner—Thach H Bui
Attorney, Agent, or Firm—Jacobson, Price, Holman & Stern, PLLC

[57] ABSTRACT

A trap closure device for opening and closing a discharge opening of a hopper on a trailer or vehicle. The closure device includes a generally rectangular frame assembly which supports a horizontally sliding door assembly on plastic type rollers as the door travels to open and close the discharge opening at one end of the frame assembly. An operating shaft assembly is supported above the sliding door assembly near the other end of the frame assembly to provide increased ground clearance. The door assembly has a slightly inclined top surface that opens away from the discharge opening and thus reduces friction when opening the device. The shaft assembly includes a single shaft attached to front and rear straps that forcibly pull open the door assembly when the shaft is rotated in one direction and forcibly pull close the door assembly when the shaft is rotated in the opposite direction.

34 Claims, 6 Drawing Sheets

TRAP CLOSURE DEVICE FOR TRAILER HOPPERS

BACKGROUND OF THE INVENTION

1. Field of the Invention

The present invention generally relates to improvements in closure mechanisms for gravity discharge openings for grain or commodity type hoppers such as those incorporated in commodity trailers or similar vehicles such as railroad hopper cars. More specifically, the present invention is applicable to hoppers which include downwardly and inwardly sloping bottom panels connected with a vertical peripheral frame member defining a generally rectangular discharge opening.

2. Description of the Related Art

Storage hoppers for various types of granular material and such are well known with such hoppers normally being provided with inwardly sloping bottom wall surfaces terminating in a manner to define a discharge opening. Such hoppers carry a wide range of products including cereal grains, crushed rock, coal, processed or ground grains for feeds, granular fertilizers, dried and processed byproducts from industry, salt, sand, and the like. The trailer typically has two hoppers that funnel the load through the discharge opening for self unloading by the force of gravity, and the opening is closed by a trap. The trap includes a frame attached to the bottom of the hopper and a closure door to retain the commodity within the hopper when shut and release the commodity from the hopper when open.

Door Closure devices are used to selectively open and close the discharge opening of the hopper to enable gravity discharge of the material. Various structures have been provided to form effective closures for the discharge openings including hinged doors and sliding doors. The hoppers could be mounted on various types of vehicles including hoppers especially adapted for use on grain or commodity trailers to enable bulk quantities of material to be transported to a desired site. The following U.S. patents relate to this field of endeavor: U.S. Pat. Nos. 2,544,117; 2,690,352; 2,859,888; 3,958,515; 3,997,089; and 4,193,159.

While these patents disclose various types of closure gates or doors which can reciprocate or pivot, the prior patents do not disclose an inclined door carried by rollers on a frame assembly and reciprocated in horizontal directions by flexible straps through rotation of a single shaft for reducing friction and the effort required for opening and closing the hopper discharge opening.

Typically the trap for opening and closing the discharge opening of the hopper includes a frame to support the mechanical components of the door and a opening and closing mechanism, all of which are located underneath the hopper. The trap frame supports the door and guides the door in horizontal motion. The opening mechanism usually includes a shaft with components to convert rotary motion of the shaft to linear motion of the door by means such as a pinion gear on the shaft and a rack gear secured to the bottom of the door. The frame guides the door in a direction aligned with the trailer. The shaft is usually connected to a universal joint which is in turn connected to a crank shaft supported at the side of the trailer by bearings and configured to permit a user to turn the crank at a convenient height and thereby move the door.

The discharge openings can be quite large, such as in the range upwards of 33"×43", to permit increased discharge, but such openings require commensurately larger doors. Most doors are supported at their side edges by a ledge on each lateral side of the frame with a plastic wear strip applied therebetween on either the ledge or the door edge. Steel rollers have also been employed between the ledge and door edge in the prior art to reduce friction. The larger doors can require considerable forces during an opening operation of the door, and such traps usually require and include a gearbox reducer on the opening shaft to reduce the torque required at the crank and facilitate operation. The gearbox reducer, however, is typically heavy and burdensome and can require relatively expensive and time consuming maintenance. In addition, the opening mechanism components are typically located below the trap door which detrimentally decreases ground clearance for the trailer which is especially critical over high grade railroad crossings. Cable systems have also been used with the cable wrapping around the shaft, but cables are prone to rust and stiffen, which will increase the opening effort required.

It is, therefore, desirable to reduce frictional forces encountered during the opening operation to decrease the effort required while maintaining optimal ground clearance for the trailer or like vehicle.

SUMMARY OF THE INVENTION

The present invention contemplates improvements for a trap closure device for a discharge opening of a hopper on a trailer vehicle or the like. The hopper trap device opens and closes the discharge opening through use of a horizontally displaceable door assembly located underneath the opening on a frame assembly of the device. The frame assembly includes rollers that support the door assembly in the frame and assist in eliminating or reducing sliding friction during the opening and closing of the door. The door also includes a top and bottom surface, with the top surface slightly inclined from horizontal upwardly in the direction of the door assembly's movement during opening to reduce friction between the top surface and the product held within the hopper as well as the seals sealing the door assembly with the frame assembly in the closed position.

The flat horizontal bottom of the door assembly of the present invention is preferably supported at the longitudinally directed side edges by the plastic rollers secured to and cantilevered from the corresponding side edges of the discharge opening framework of the frame assembly. The top inclined surface of the door is preferably formed by a top panel angled upwardly from horizontal and a plane coincident with the flat bottom surface of the door so that the rear of the top door panel is higher than the front, the rear being disposed in the direction of travel of the door assembly when the trap device opens. The door thus forms a wedge shape in the vicinity of the discharge opening framework that provides a reduction of the effort required to open the door as a result of decreased friction between the door and the commodity within the hopper and elimination of sliding friction between the top panel of the door and the sealing means on the frame.

Furthermore, the door is forcibly moved in each direction by a flexible drive belt assembly, preferably in the form of straps made of woven plastic or other weather-resistance material which are secured to opposed lateral edges of the door. The other end of the straps is attached to a common operating shaft that enables rotation of the shaft preferably in one direction to open the door and rotation in the opposite direction to close the door in an efficient manner without sacrificing ground clearance for the trailer, vehicle or the like.

The present invention provides a closure trap device that includes a frame assembly that carries a door assembly for opening and closing a generally rectangular discharge opening of a hopper on a commodity trailer or the like. A shaft assembly supported on the frame assembly provides forces that move the door assembly in the frame assembly. The device is preferably constructed of stainless steel or other weather-resistance material or otherwise painted or coated to provide the desired protection. The frame assembly preferably includes a generally rectangular discharge opening framework with parallel frame side rails and a front frame rail and a rear frame rail positioned therebetween by welding or the like to provide a generally rectangular rigid assembly. When installed under the hopper, the discharge opening framework is proximate to and surrounds the discharge opening of the hopper. The frame side rails carry the load of the door assembly, and all of the frame rails preferably include inside located downwardly extending seals attached thereto that abut against the top inclined surface of the door when closed to seal the material within the hopper and prevent leaking of the material or exposure of such to the elements existing outside the hopper.

The frame side rails are generally transversely spaced and aligned and extend in the lengthwise direction of the trailer. The door assembly preferably travels in the frame assembly horizontally in the same direction underneath the bottom edges of the front and rear frame rails. The frame side rails extend rearwardly beyond the rear frame rail, thus forming rail extensions, which serve to support the door assembly when in the open position, to provide support for the operating shaft assembly, and to provide a closing stop to properly position the door in the closed position. The side rail extensions are preferably reinforced to maintain their parallel relationship aligned with the direction of travel of the door assembly preferably by a threaded long U-bolt or the like extending therebetween. The long U-bolt slips through a set of dual holes on one frame side rail, extends perpendicularly to and through a set of dual holes provided on the other frame side rail, and secured by tightening nuts or the like. Other forms of reinforcing the rear portions of the frame side rails are also contemplated by the present invention, and the U-bolts are simply an expedient design. A stopper is preferably secured to at least one frame side rail extension to prevent rearward motion of the door assembly beyond a safe position in the trap frame assembly when the door is opened.

The frame side, front, and rear rails are generally relatively thin flat beams of sturdy rigid material, such as stainless steel or the like, with lateral side edges directed generally vertically. These rails include outwardly angled top portions that sealingly engage and match the contour of and are secured to the periphery of the discharge opening of the hopper by any suitable mechanism such as welding, fasteners, or the like. Rollers are secured along and cantilevered from preferably an inwardly curved inside bottom portion of the frame side rails at convenient intervals along their length, and they are preferably made of tough plastic or similar sturdy yet resilient material to carry the door assembly and roll along its flat bottom surface as it travels to avoid sliding friction that normally occurs in conventional closure traps when the door assembly travels in the frame.

The door assembly includes a top door panel, preferably made of stainless steel or the like, that blocks the discharge opening of the hopper when the door assembly is in a closed position. Beneath the top panel are horizontally oriented door side angle rails each with a flat bottom surface that lie atop the rollers of the frame side rails which bear the weight of the door assembly. These door side rails are preferably right-angle beams that extend the length of the door assembly. The top door panel has a length sufficient to close and seal the discharge opening and preferably includes downwardly bent lips at the front and rear edges. The door side rails preferably extend rearwardly beyond the rear edge of the top door panel as part of a rear structure for the door assembly. The top door panel is preferably reinforced with transversely oriented stiffening beams or members, preferably in the form of upturned C-shaped channel beams, positioned under the top door panel and spaced along its length. These stiffening beams are secured, by welding or the like, to the top door panel and the door side rails in such a manner that the top door panel is inclined upwardly and rearwardly from horizontal as well as the flat bottom surface of the door assembly and the door side rails such that a generally wedged shape is formed with the rear edge of the door panel being relatively higher than the front edge. The angle of inclination of the top door panel is preferably on the order of approximately 1°, but may vary in the range between 0° up to about 5°.

Seals are secured to the frame side, front, and rear rails of the discharge opening framework that abut and engage the top door panel when the assembly is in the closed position. The side seals conform to the generally wedge shape of the door assembly and are made of any appropriate material for forming a tight seal such as rubber or the like. Because of the wedge shape of the door assembly, opening of the door will cause the top panel to move away from the seals and permit movement of the door assembly without sliding friction with the seals, which would normally occur on conventional closure trap devices. Additionally, the wedge shape is advantageous in decreasing friction between the top door panel and the commodity within the hopper. More specifically, as the door assembly is opened the top inclined surface of the top door panel moves rearwardly while effectively dropping downwardly away from the commodity at any point along the direction of travel of the door because of the wedge shape. This decreases friction with the material in the hopper enabling less effort to open the door assembly.

The door assembly also includes a rear structure rearward from the door panel. Preferably, the door side rails extend rearward beyond the top door panel and are secured to a door assembly rear rail by brackets and fasteners or the like. The door assembly is opened and closed by the operating shaft assembly that includes attached flexible straps, preferably made of woven plastic or other durable weather-resistant material, that attach to brackets secured to both longitudinal ends of the door assembly. The front end of the door assembly preferably includes a front bracket secured on each lateral side thereof by fasteners or the like to the bottom of a front stiffening beam that is preferably located near the front end of the door assembly. Each of the front door brackets wraps underneath and clears the frame side rails to provide an attachment point located laterally outward from the frame side rails for each of two front straps from the shaft assembly. A rear bracket is secured, preferably by fasteners, rearward of the shaft of the shaft assembly on each side of the top of the door rear structure, preferably on the top of the door rear rail, inward of the frame side rails to each provide an attachment point for one of two rear straps from the shaft assembly. The rear bracket preferably includes longitudinally oriented slots through which the fasteners secure the rear bracket to the door rear rail to enable adjustment of the attachment point of the rear bracket relative to the shaft in the lengthwise direction of the trap device.

The operating shaft assembly is preferably located rearward from the frame rear rail and forward of the door rear rail and is secured perpendicular to and supported atop and by the frame side rails in the portion forming the side frame rail extensions. There are preferably four straps, two front straps directed forward and two rear straps directed rearward with a set of each on each end of the shaft. Each set of straps preferably has the front strap secured to the shaft laterally outward from the respective frame side rail and the rear strap connected inward from the frame side rail.

Each strap is secured at one end to the shaft preferably by a strap guide bushing that includes a retaining pin and associated tightening screws. The shaft end of the strap is positioned over a longitudinal trough or groove formed on the shaft that is at least as long as the retaining pin, and the retaining pin fits atop the strap end and securely retains the strap in the trough by pressure exerted from the tightening screws that are preferably threaded through collars on both sides of the strap guide bushing and bear against the retaining pin when tightened. Such an arrangement provides a quick and easy method for changing straps when necessary due to wear, maintenance or such. Each strap guide bushing preferably also includes side walls inward from the collars that guide the strap onto the shaft such that the strap will wrap over itself as it winds to increase the relative displacement of the door assembly per degree of rotation of the shaft as the wrappings of the strap increase.

The opposite ends of the straps are secured to the corresponding front or rear door brackets such that the straps are left in a generally horizontal orientation when taut. Each of these strap ends are preferably folded back and secured to itself, preferably by stitching or the like, to provide an "eye" through which a U-bolt may be slipped, the ends of which are secured, preferably by fasteners or the like, to the respective bracket.

This configuration for the straps locates the front straps with clearance outward from the frame side rails and the rear straps with clearance inward from the frame side rails. Space is efficiently utilized because the opening mechanism for the trap is located close to the hopper discharge opening near the top of the device to provide optimal ground clearance for the vehicle or such, as opposed to that found in conventional traps in this field.

In addition, each set of straps has the straps attached to the shaft in the same way, such that each in the set is wrapped either "over" or "under" the shaft. Preferably, all straps are wrapped "over" the shaft. By wrapping over the shaft, debris or such that is found on the top of the strap will fall off before that portion of strap is wound onto the shaft. It is necessary at least that each set of straps has each strap wound on the shaft similarly because this arrangement enables the single shaft to both open and close the door assembly in relation to the direction of rotation of the shaft. For example, when opening the door assembly, rotating the shaft winds up the front straps while the rear straps play off from the shaft. Reversing the direction of rotation of the shaft will close the door assembly and wind up the rear straps onto the shaft and play off the front strap from the shaft.

The frame rails preferably also include skirts attached thereto by fasteners or such to direct the material from the hopper through the discharge opening framework and avoid the parts of the frame assembly located on the inward periphery thereof. The rear skirt also operates as a scraper to scrape the commodity off of the top door panel as the door assembly opens.

To open the door assembly and rotate the shaft, a conventional method can be used which includes attaching a universal joint to one end of the shaft to which is connected an upwardly extending tube attached by bearing support to the outward understructure of the trailer or such with a hand crank extending outwardly for use by an operator at the side of the trailer or such.

It is therefore an object of the present invention to provide an improved trap closure device having a generally rectangular frame surrounding a gravity vehicle hopper opening which supports a generally horizontally traveling door between an open and closed position over the hopper opening.

It is a further object of the present invention to provide a trap closure device in accordance with the preceding object which has a top surface on the horizontally traveling door that inclines upwardly from the front edge of the door towards the rear edge of the door so that the door opens in the rectangular frame away from the hopper opening to reduce the friction between the door top surface and material in the hopper as well as the door seals when the door is opening.

It is another object of the present invention to support the generally horizontally traveling door on plastic rollers or the like secured to the frame side rails in order to further reduce the frictional forces and facilitate opening and closing the trap closure device.

It is a still further object of the present invention to provide a trap closure device in which the opening and closing of the horizontally traveling door is forcibly operated by a single shaft positioned above the door and supported by the side rails of the generally rectangular frame so as to provide increased ground clearance for the trap closure device.

Yet another object of the present invention is to provide a flexible drive belt assembly for opening and closing of the moving door in the form of a set of one or more straps with the inner ends wound in opposite directions about the single operating shaft and the distal ends attached to the leading edge and trailing edge, respectively, of the generally horizontally moving door, with the set of straps positively moving the door in an opening or closing direction.

Still another object of the present invention is to provide a trap closure device in accordance with the preceding object in which the straps are made of weather resistant material and easily replaceable so as to provide low maintenance requirements and relatively frictionless operation for opening and closing the trap.

A yet further object of this invention to be specifically enumerated herein is to provide a trap closure assembly in accordance with the preceding objects which will conform to conventional forms of manufacture, be of simple construction and easy to use, maintain and repair so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming apart hereof, wherein like numerals refer to like parts throughout.

DESCRIPTION OF THE PREFERRED EMBODIMENT

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 1:
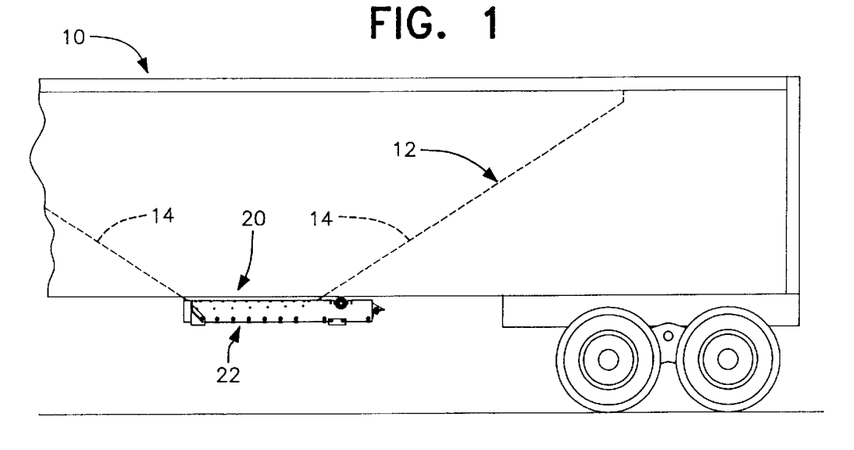
FIG. 1 is a side view of a trailer with a preferred trap closure device in accordance with the present invention installed underneath a hopper and shown in a closed position.

FIG. 1 illustrates a conventional grain or commodity trailer generally designated by the numeral 10 which includes at least one hopper 12 having sloping walls 14. The hopper 12 includes a bottom discharge opening generally indicated by the numeral 20 for gravity discharge of the commodity from the hopper. FIG. 1 also shows the closure trap device of the present invention, generally indicated by the numeral 22, installed at the bottom of hopper 12 of trailer 10 beneath the respective discharge opening 20.

Figure 2:
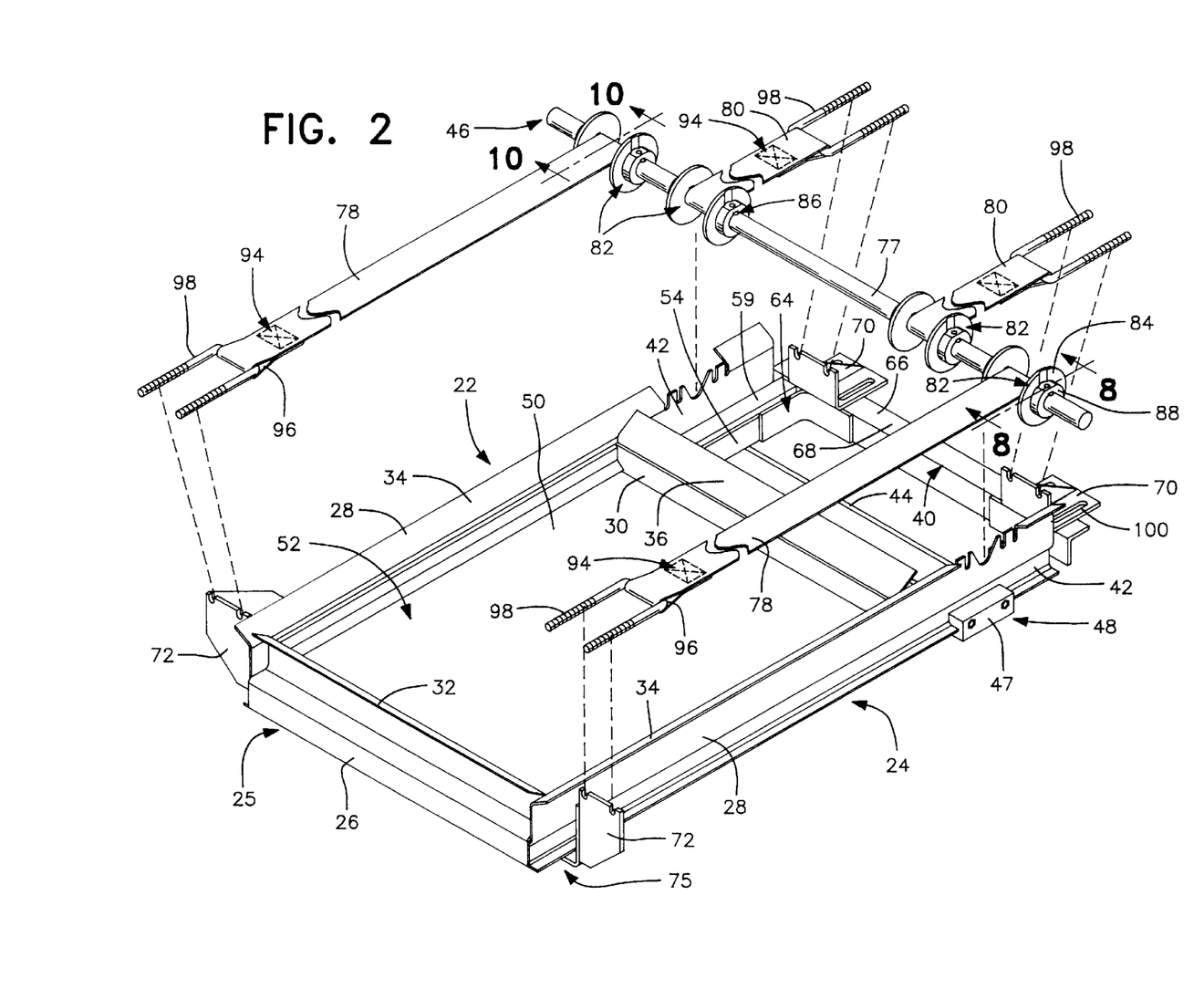
FIG. 2 is an exploded perspective view of the trap closure device of FIG. 1 showing the door assembly in the frame assembly in the closed position and the various connection points of the operating straps.
Figure 3:
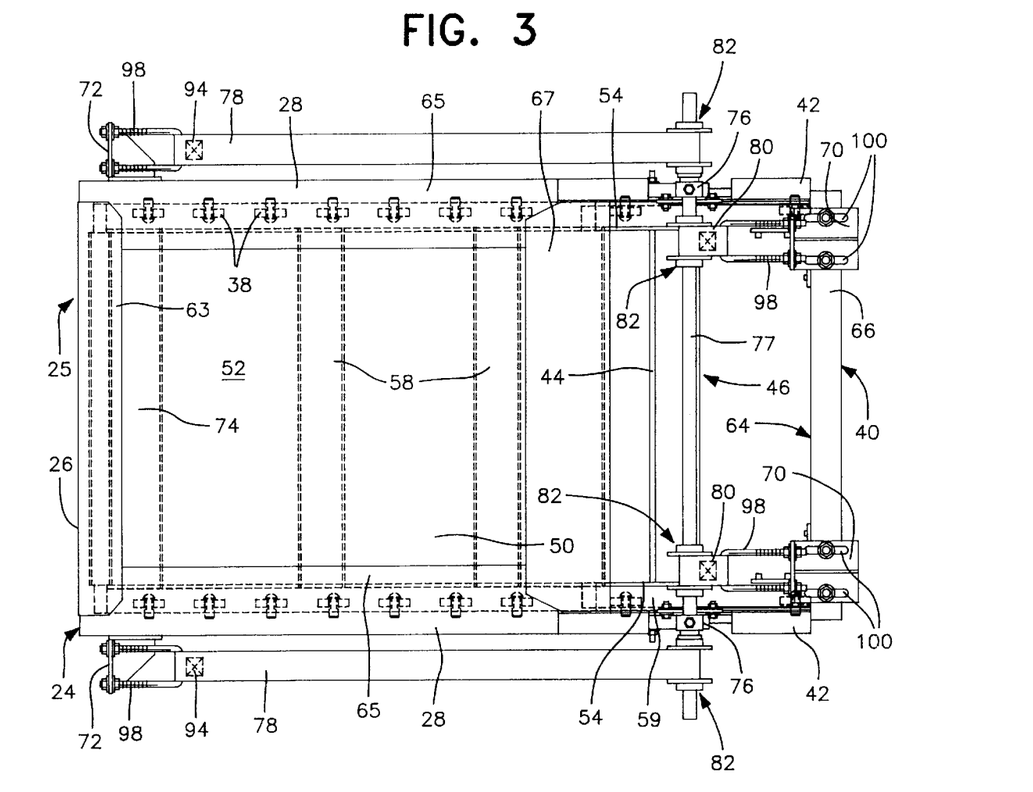
FIG. 3 is a top view of the trap closure device shown in FIGS. 1 and 2 with the skirts installed on the frame assembly.
Figure 4:
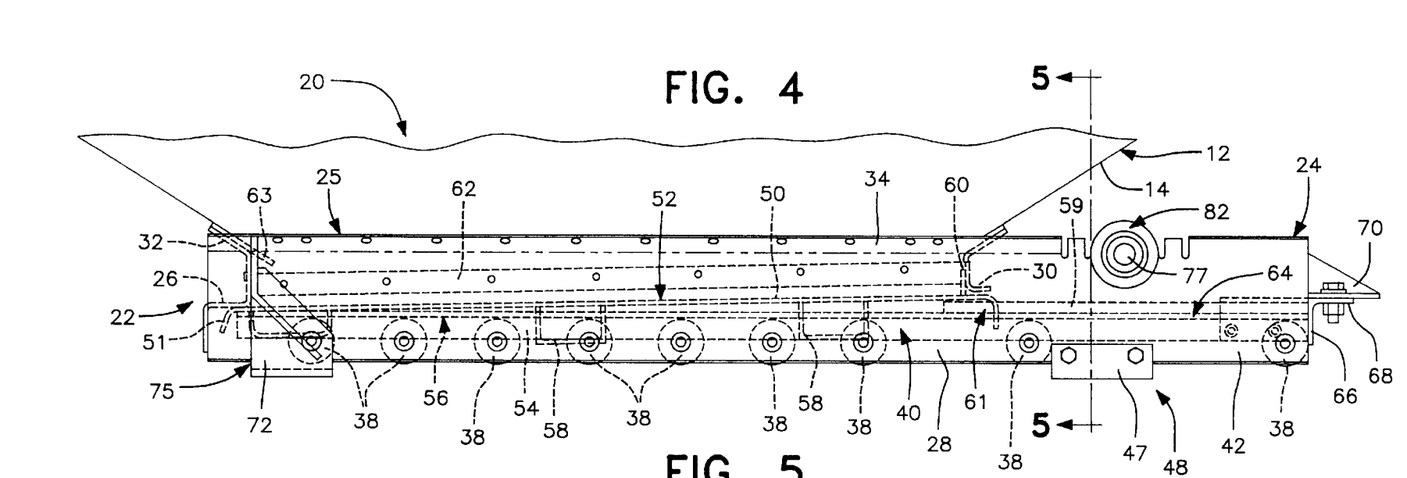
FIG. 4 is a side view of the trap closure device shown in FIGS. 1 and 2 attached beneath a hopper showing the door assembly in the closed position and the straps removed.
Figure 5:
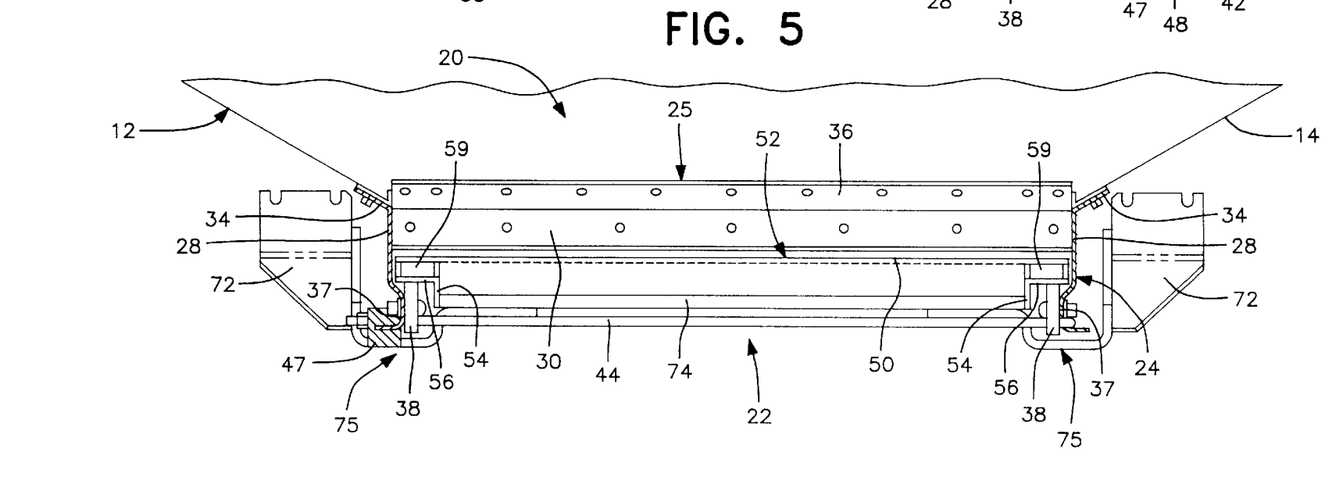
FIG. 5 is a rear cross-sectional view of trap closure device shown in FIG. 4 taken along section line 5—5 of FIG. 4.

As shown in FIGS. 2 and 3, the closure trap 22 includes a rectangular frame assembly generally indicated by the numeral 24 that has, as installed, a generally vertically disposed discharge opening framework 25 at the forward end of the trap device 22. The frame assembly 24 has a pair of generally parallel side frame rails 28 with a front frame rail 26 and a rear frame rail 30 secured therebetween that forms the discharge opening framework 25. The discharge opening framework 25 surrounds the periphery of the discharge opening 20 of the hopper 12 when the trap device 22 is installed, as shown in FIGS. 4 and 5. The frame rails 26, 28, and 30 include outwardly angled top portions 32, 34, and 36, respectively, that conform to the slope of the sloping walls 14 and are secured thereto by conventional methods, preferably by removable fasteners or the like, to hold the trap device 22 in sealing engagement with the hopper walls 14 underneath the discharge opening 20 of hopper 12. Secured to and cantilevered preferably from an inwardly curved bottom portion 37 of the frame side rails 28 are spaced rollers 38 that support a door assembly generally indicated by the numeral 40, as shown in FIGS. 4 and 5.

The frame side rails 28 preferably have rear portions or extensions 42 located rearwardly beyond the frame rear rail 30 to support the door assembly 40 on additional rollers 38 as the closure trap device 22 is opened. It should be noted that the functions performed by the rear portions or extensions 42 of the frame side rails 28 can alternatively be provided by a structure other than the frame side rails 28, but it is preferred that the frame side rails 28 have a length sufficient to extend rearward beyond the frame rear rail 30 to provide the desired operating and support structure. Preferably, a long U-bolt 44 is slipped through dual openings in one frame side rail rear portion 42 and extends perpendicularly to be secured through corresponding dual openings in the opposite side rail rear portion 42 to strengthen and rigidify the structure of this rear portion of the frame assembly 24. The long U-bolt 44, the frame front rail 26, and the frame rear rail 30 maintain the frame side rails 28 in a generally parallel relationship along their entire lengths for supporting the door assembly 40.

Figure 9:
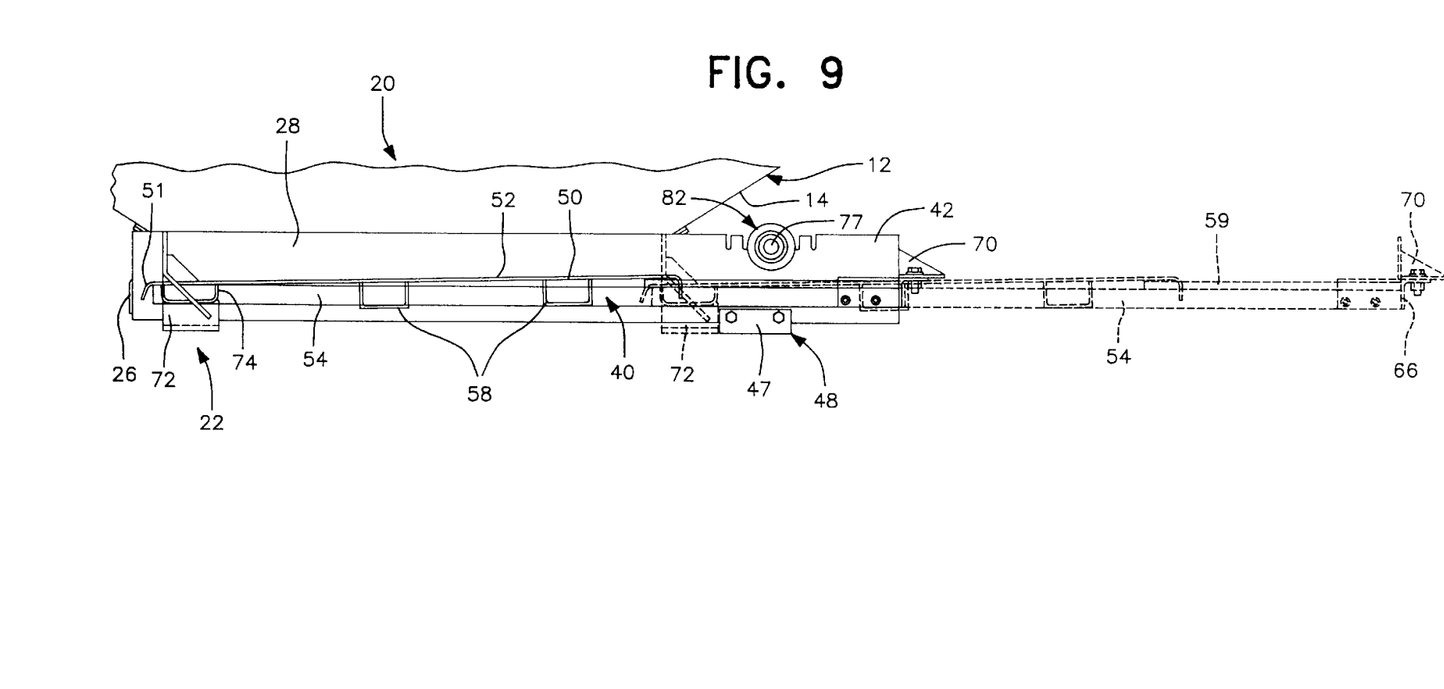
FIG. 9 is a schematic side view of the preferred trap closure device of the present invention showing the door assembly in the closed position in solid lines and in the open position in broken lines.

As shown in FIG. 2, the rear portions 42 of the frame side rails 28 also function to support the operating shaft assembly, generally indicated by the numeral 46, that operates to forcibly open and close the door assembly 40. In addition, the ends of the extensions 42 on the frame side rails 28 rearward from the discharge framework 25 provide a stopping means to limit the travel of the door assembly 40 at the desired closed position for the trap device 22 by forming abutments engaged by the rear rail 66 of the door assembly 40. At least one of the frame side rails should preferably include a stopper 47 secured thereto as at 48 by long U-bolt 44 to limit rearward travel of the door assembly 40 to an open position by forming abutments engaged by front brackets 72 of the door assembly 40. FIG. 9 shows the door assembly 40 in the fully closed position in solid lines and in the fully open position in broken lines with the limitations of travel of the door assembly 40 as described above.

The frame side rails 28, the front frame rail 26, and the rear frame rail 30 are preferably made of stainless steel or other weather-resistant material that affords proper maintenance and durability as well as sanitary conditions and such which are particularly important when food stuffs are contained in the hopper 12. These rails may be formed from stamped sheet metal, elongated flat beams, or the like to form a desired cross sectional shape for providing the angled top portions 32, 34, and 36 and for supporting the rollers 38 at the inwardly curved bottom portions of the frame side rails 28, as shown in FIG. 5.

The door assembly 40 reciprocatingly travels horizontally in the frame assembly 24 on the rollers 38 to open and close the closure trap device 22 and consequently the discharge opening 20 to permit or prohibit the gravity discharge of the material contained in the hopper 12. As best shown in FIGS. 4 and 9, the door assembly 40 preferably includes a door top panel 50 having an inclined top surface 52. The top panel 50 is preferably a flat plate made of stainless steel, or another type of sturdy weather-resistant material or a material coated or treated for weather-resistant, that is inclined from horizontal, when the device 22 is installed, to provide the inclined top surface 52.

The door assembly 40 also includes door side rails 54 that have a flat bottom surface as at 56, shown in FIGS. 4 and 5, that is coincident with a generally horizontal plane when the device 22 is installed beneath the hopper 12. FIGS. 4 and 5 also show the rollers 38 on the frame side rails 28 that support the door assembly 40 along the flat bottom surface 56. The door side rails are preferably formed from elongated right angle beams made of weather resistant-material such as stainless steel or the like. One flange of the angle beam provides the flat bottom surface 56, and these door side rails preferably extend the length of the door assembly 40. In any case, the flat bottom surface 56 should extend the entire length of the door assembly 40 to enable the door assembly 40 to reciprocate within the frame assembly 24 atop of the rollers 38 along a generally horizontal path.

Referring to FIGS. 4 and 9, the top panel 50 is secured to stiffening members 58 which are also secured to the door side rails 54, all preferably by welding or the like. Preferably, the stiffening members are U-shaped channel beams that include parallel vertical flanges secured beneath and spaced along the top panel 50 and perpendicular to the door side rails 54. The construction of the door top panel 50, the door side rails 54, and the stiffening members 58 provides the inclined top surface 52 as shown in FIGS. 4 and 9. The top surface 52 is inclined from horizontal which is in a plane coincident with the flat bottom surface 56 of the door side rails 54 resulting in the rear edge of the door top panel 50 being relatively higher than the front edge of same. For reference purposes, it should be understood that the direction in which the door assembly 40 travels during opening of the trap device 22 is towards the "rear" and the opposite direction is the "front", throughout the description of the invention. As is shown in FIGS. 4 and 9, the stiffening members 58 are secured to the door side rails 54 at heights that increase toward the rear direction of the door assembly 40 to provide the inclined top surface 52. In addition, panel blocks 59 are secured to the door side rails 54 on a top surface as at 61 in FIG. 4 near and underneath the rear lateral side edges of the door top panel 50 to reinforce the inclination position of the panel 50. For purposes of the present invention, it is preferred that the top surface 52 of the door top panel 50 be inclined, but the present invention contemplates even a top surface 52 with no inclination. In this manner, the top surface 52 can have an angle of inclination in the range of 0° up to about 5°, but an angle of approximately 1° is preferred. The inclination of the top surface 52 results in a generally "wedge" shape for this portion of the door assembly 40.

Figure 6:
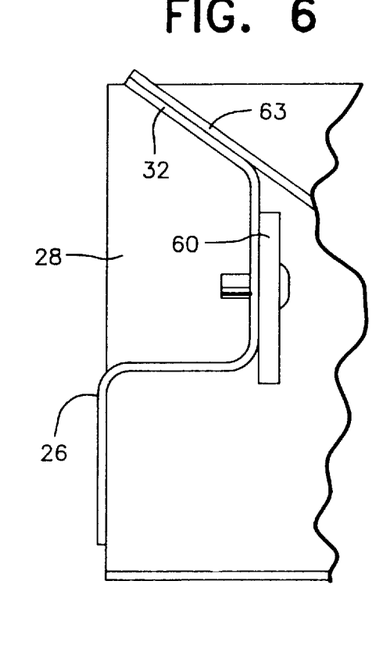
FIG. 6 is a schematic cross-sectional view of the front frame rail of the preferred trap closure device of the present invention taken from the inside of the discharge opening framework showing the front seal and skirt attached.

The rails of the discharge framework 25 preferably include seals along their lengths that abut the inclined top surface 52 of the door assembly 40 when in the closed position to prevent spillage of the material from within the hopper 12 or the influx of foreign material or debris, such as road water, in through the trap device 22. As shown in FIG. 6, the frame front rail 26 has a seal 60 disposed generally vertically and secured thereto by fasteners or the like for adjustability. The front edge of the top door panel 50 preferably includes a downwardly turned lip 51, shown in FIGS. 4 and 9, that facilitates guiding the door panel 50 under the seal 60 on the front frame rail 26. The rear frame rail has a similarly disposed seal as well, as shown in FIG. 4, that abuts the rear edge of the inclined top surface 52 of the top door panel 50.

Figure 7:
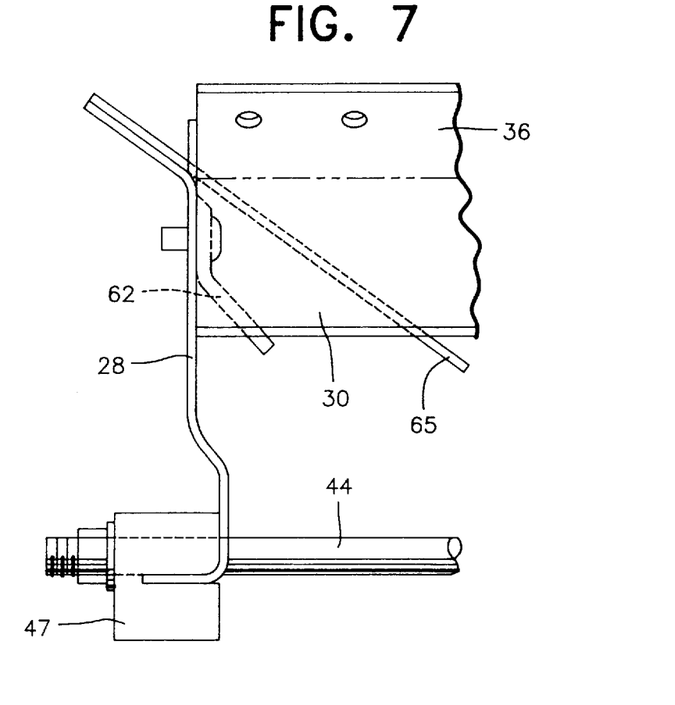
FIG. 7 is a schematic detailed cross-sectional view of the frame side rail of the preferred trap closure device of the present invention taken from the rear of the discharge opening framework showing the side seal, side skirt, and stopper attached.

Preferably, each frame side rail 28 also includes seals 62, as shown in FIG. 7, that are angled inwardly near the bottom portion to abut the inclined top surface 52 of the closed door assembly 40. These seals 62 are preferably secured along their lengths to the frame side rails 28 at an angle from horizontal, shown in FIG. 4, that corresponds with the angle of inclination of the inclined top surface 52. In this manner, the wedge shape of this portion of the door assembly 40 opens and closes the discharge opening 20 of the closure trap device 22. While opening the inclined door assembly 40, the inclined top surface 52 moves in a rearward direction as well as an apparent downward direction relative to the material in contact in the hopper 12. This motion alleviates part of the friction between the inclined top surface 52 and the material to reduce the effort required to open the door assembly 40. Furthermore, the seals 60 and 62 of the discharge framework 25 that abut the inclined top surface 52 are relieved of contact with the latter as the door assembly travels rearward during the opening operation which eliminates or reduces sliding friction therebetween and thereby further reduces the effort required during the opening operation.

In addition, it is preferred that the discharge framework 25 includes inwardly inclined skirts such as a front skirt 63, side skirts 65, and a rear skirt or scraper 67, as shown in FIG. 3. These skirts function to direct the discharge of material from the hopper 12 through the discharge framework 25 without contacting or interfering with the underlying components of the discharge framework 25, such as rollers 38 or seals 60 and 62, which might otherwise be detrimental to the operation of the trap device 22.

The rear scraper 67 also serves to prevent the material in the hopper 12 from being pulled underneath the rear frame rail 30 when the inclined top surface 52 passes during the opening of the door assembly 40. The rear scraper 67 is preferably made of plastic or a similar material having the desired resilient properties. The rear skirt or scraper 67 is designed to remain in contact with the top inclined surface 52 of the door panel 50 during the opening operation to ensure that material is properly scraped off of the top surface 52 as the trap device 22 opens.

This scrapping feature may limit the degree at which the top panel 50 may be inclined from horizontal. As the door assembly 40 moves rearward to open the trap device 22, the top inclined surface 52 drops downwardly away from the rear frame rail 30 and the rear scraper 67. The rear scraper 67 should preferably be capable of adapting to the change in distance to the inclined surface 52. As the degree of inclination for the top door panel 50 increases or the length of the discharge opening 22 increases, the more the rear scraper 67 should be capable to adapt to the changing height of the inclined top surface 52 as the trap device 22 opens. Therefore, the rear scraper 67 can be provided with a structure, not shown, that positively moves the bottom edge of the rear scraper 67 down into contact with the inclined top surface 52. The preferred angle of inclination of approximately 1° for the inclined surface 52 has been chosen for a discharge opening 20 having a length of approximately 43" and a rear scraper 67 made of plastic or similar resilient material. It should be understood, therefore, that higher degrees of inclination for the inclined top surface can be provided when designing shorter length discharge openings 20 or when the rear scraper 67 has the ability to properly conform for scraping the entire length of the inclined surface 52.

The door assembly 40 preferably also includes a door rear structure indicated by the numeral 64 that extends rearward beyond the door top panel 50 of the door assembly 40. Preferably, the door side rails 54 extend rearward beyond the door top panel 50 to secure a perpendicularly disposed door rear rail 66 and form the door rear structure 64. The door side rails 54 may not necessarily extend rearward themselves to form the rear structure 64 but can alternatively be attached to similar members that secure the door rear rail and form the structure 64. The rear door structure 64 should be provided such that an attaching point or bracket for the door assembly 40 is available so that the door assembly 40 can be pulled forward to close the door assembly 40 and trap device 22 as described further herein.

The door rear rail 66 is shown in FIGS. 4 and 9 as a right angle beam attached to the door side rails 54 by fasteners and brackets as shown, or any equivalent method such as welding or the like. The rear rail 66 includes a top surface portion 68 that preferably has openings to secure rear brackets 70 to each lateral side of the rear door structure 64 for attachment to the shaft assembly 46.

As shown in FIGS. 4 and 5, the door assembly 40 also preferably includes front brackets 72 located on each lateral side near the front thereof. Each front bracket 72 is preferably attached to a front stiffening member 74 on its underside by fasteners or such. The front bracket 72 is formed to extend laterally outward underneath the frame side rail 28 as at 75 to provide a vertical attachment point for the shaft assembly 46 laterally outward from the frame side rails 28 to enable the shaft assembly 46 to pull the door assembly 40 rearward and open the trap device 22.

FIG. 3 shows the operating shaft assembly 46 supported atop the frame assembly 24 rearward of the frame rear rail 30 and forward of the door rear rail 66 by bearings 76 on a shaft 77. The shaft assembly 46 preferably includes a total of four straps. As shown in FIGS. 2 and 3 there are preferably two front straps 78 and two rear straps 80 with a set of each near each end of the shaft 77. In this manner, each set of straps includes a front strap 78 located laterally outward of the frame side rail 28 and a rear strap 80 located laterally inward of the frame side rail 28. This arrangement for the front straps allows complete opening of door panel 50 because there is no interference of the front bracket, such as with the frame rear rail 30, during opening operation of the trap device 22 except for the limiting stopper 47. In addition, the front brackets 72 do not interfere with or cross the discharge opening 20 which permits the unfettered discharge of the material from the hopper 12.

Figure 8:
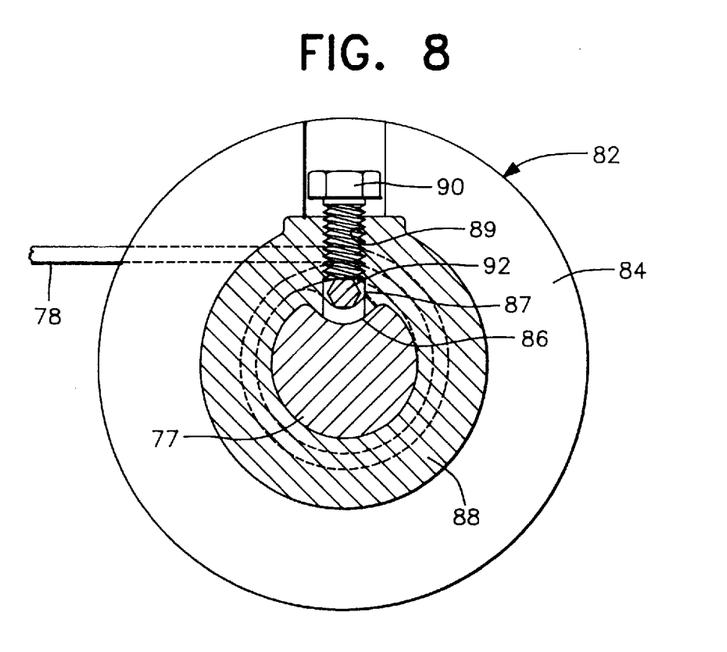
FIG. 8 is a cross-sectional view of the strap guide bushing taken along section line 8—8 of FIG. 2.
Figure 10:
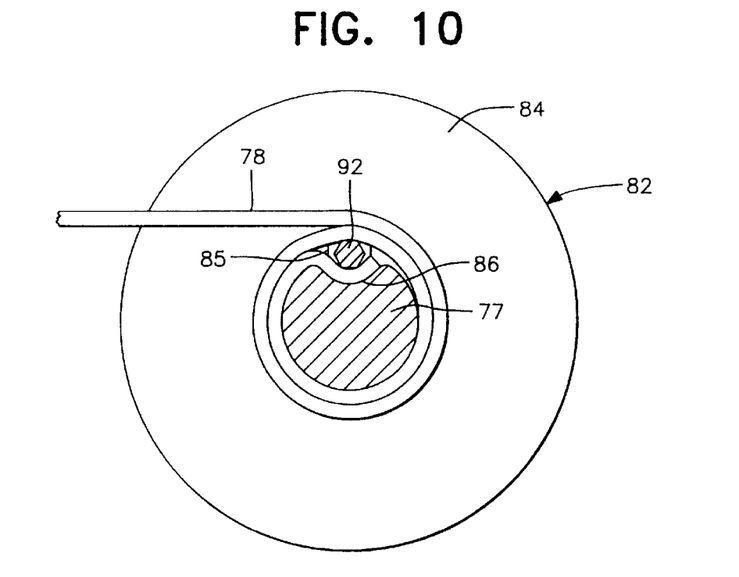
FIG. 10 is a cross-sectional view of the strap guide bushing taken along the section line 10—10 of FIG. 2.
Figure 11:
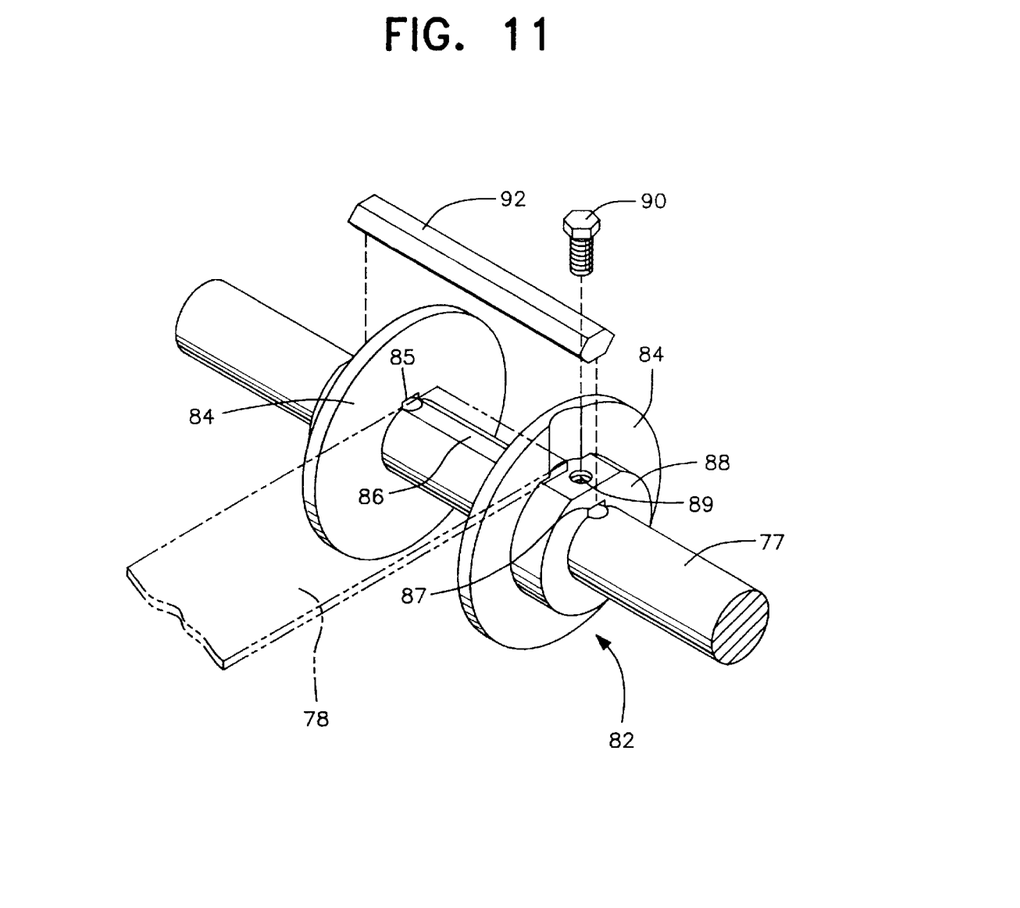
FIG. 11 is a detailed exploded perspective view of one strap guide bushing as shown in FIG. 2 showing the positioning of the retaining pin with the front strap shown in broken lines.

One end of each of the straps 78 and 80 is connected to the shaft 77 preferably as in the manner shown in FIGS. 8 and 11 which depict, as way of example, a front strap 78 connection, but the connection for a rear strap 80 is preferably the same. The shaft assembly 46 includes a strap guide bushing indicated by the numeral 82 in FIGS. 2, 3, 8, 10, and 11 for each attached strap 78 and 80. As best shown in FIGS. 8, 10, and 11, the strap guide bushing 82 preferably includes side walls 84 that guide the windings of the strap 78 or 80 onto the shaft in a layered configuration. The shaft 77 is preferably formed with a longitudinally aligned trough or groove 86 located at each strap guide bushing 82 which spans at least the distance of the length of a retaining pin or key 92. Outward from each bushing side wall 84 is a collar 88 that is rigid with the side wall 84. Each collar 88 includes a tapped through hole as at 89 for tightening screws 90 that act in conjunction with the retaining pin 92 to secure the end of the strap 78 or 80 to shaft 77 and lock the bushings 82 securely to the shaft 77 in the manner described hereafter.

An end of each strap 78 or 80 is laid over the trough 86 and underneath the retaining pin 92 both of which extend through the side walls 84 and into each of the side collars 88 a sufficient distance for coaction with the tightening screws 90 in the collars 88. The tightening screws 90 each bear against the retaining pin 92 near its ends upon tightening of the screws 90 on both sides of the strap guide bushing 82 to retain the strap into the trough 86 and securely attach the end of strap 78 or 80 to the shaft 77. The side walls 84 include a notch 85 and collars 88 include a notch 87 receiving the pin 92 to rotationally lock the bushing 82 to shaft 77 when screws 90 are tightened. By this attachment arrangement for straps 78 or 80, the cooperation between the trough 86 and the retaining pin 92 enables quick replacement of the straps 78 or 80. Alternate structures known to those skilled in the art could be utilized to retain the strap ends onto shaft 77.

Each set of straps should have the front strap 78 and rear strap 80 wind onto the shaft 77 in opposite directions, such as "over" the top of the shaft 77 as shown in the Figures. Similarly, the straps 78 and 80 of each set may wind onto and "under" the shaft 77. However, both straps of each set should wind in the same manner, either "over" or "under". By winding the front straps and rear straps both "over" or "under" the single shaft 77 can be operated to both open and close the door assembly 40 depending upon the direction of rotation of shaft 77. Winding the straps "over" the shaft is particularly advantageous since foreign debris or such lying atop the straps 78 or 80 will fall off by force of gravity before that portion of the strap is wound up onto the shaft 77.

The opposite ends of the front and rear straps 78 and 80 distal from the shaft 77 are connected to the door assembly 40 preferably by the front and rear brackets 72 and 70, respectively. These ends of the straps 78 and 80 are each preferably folded over and secured back onto itself preferably by stitching as at 94 or other secure means to form an eye loop 96, as shown in FIG. 2. A short threaded U-bolt 98 is preferably slipped through the eye loop 96 to be attached to the corresponding front or rear bracket 72 or 70 as can be seen in FIG. 3. The rear bracket 70 preferably includes slots 100 through which bolts, fasteners or such extend to secure the rear bracket to the door rear rail 66. The use of threaded U-bolts 98 and the slots 100 on the rear bracket 70 as described enables adjustment of the effective length of the straps 78 and 80 from the shaft 77 so that unwanted slack in the straps can be adjusted and removed, but attachment means other than that described are considered within the scope of the present invention.

The particular arrangement of the front and rear straps 78 and 80 and the corresponding brackets 72 and 70 as described is advantageous because the opening mechanism for the trap device 22 is thereby positioned above the lower extremities of the trap device to obtain a desirable maximum ground clearance for the trailer 10, or vehicle or such.

To operate the trap device 22, a hand crank can be directly attached to an end of the shaft 77. Alternatively, a shaft end can be connected to a universal joint which is connected to an upwardly directed tube or rod with support bearings attached to the understructure of the vehicle or such to make a hand crank available at a side extremity of the trailer or such. These methods are conventional in the art and are, therefore, not shown.

The operation of the closure trap device 22 is now herein described. To open the trap device 22 and discharge opening 20 when the door assembly 40 is in the closed position with the front straps 78 unwound from a bushing 82 and the rear straps 80 wound on a bushing 82, shaft 77 of the shaft assembly 46 is rotated, as viewed from the near side in FIG. 2, in a clockwise direction by a crank means. The front straps 78 wind around the shaft 77 as it rotates while the rear straps 80 are played off of the shaft 77. The front straps 78 thereby transmit a pulling force to the door assembly 40 at the front brackets 72 and rearward movement of the rear brackets 70 is permitted as rear straps 80 unwind from the shaft 77. The door assembly 40 and top inclined surface 52 moves horizontally rearward and away from seals 60 and 62 due to the wedge shape of the front portion of the door assembly 40. As each strap 78 winds onto the shaft 77, the side walls 84 of the strap guide bushing guide the strap 78 to wind over itself during the opening operation to effectively increase the apparent turning radius of the shaft 77 which increases the displacement of the door assembly 40 for the degree of rotation of the shaft 77. The stopper 47 limits the distance the door assembly 40 can travel rearward by blocking the path of the front bracket 72. The door assembly 40 is now open and cantilevered from the rear portion 42 of the frame side rails 28 with the forward portion or edge of the top door panel 50 resting against the lower edge of the frame rear rail 30, as shown in schematic in FIG. 9.

To close the trap device 22 and the discharge opening 20, the rotation of the shaft 77 is reversed and turned in the counter-clockwise direction as viewed from the near side in FIG. 2. Rear straps 80 now wind onto the shaft 77 and front straps 78 play off of it in the same but opposite manner as described above in opening the door assembly 40. In this manner, the rear strap 80 exerts a forward pulling force on the door assembly 40 to close such. As the door assembly 40 approaches the front of the frame assembly 24, the seals 60 and 62 on the discharge framework 25 engage the inclined top surface 52 to abut and seal the latter when the door assembly 40 is in a fully closed position. The door assembly is in the closed position and limited from further forward travel when the door rear rail 66 abuts the ends of the frame side rails 28, as shown in FIGS. 2 and 4.

It should be appreciated that the scope of the invention is not limited to the precise embodiments described, and the foregoing is considered as illustrative only of the principles of the invention. While the invention has been described herein in conjunction with preferred embodiments thereof, it is evident that numerous alternatives, modifications, and variations will be apparent to those skilled in the art. As such, the preferred embodiments of the invention as set forth herein, are intended to be illustrative, and it is not desired to limit the invention to the exact construction and operation shown and described. Accordingly, all suitable changes, modifications, and equivalents may be made or resorted to, falling within the true spirit and full scope of the invention as described herein and defined in the appended claims.

What is claimed is:

1. A trap door closing device for opening and closing a discharge opening of a hopper containing granular material, comprising a frame assembly, said frame assembly including a discharge framework extending generally normal to and surrounding the discharge opening, a door assembly supported for reciprocating travel in said frame assembly generally parallel to a plane coincident with the discharge opening for opening and closing the discharge opening, said door assembly including a generally flat top inclined surface that closes the discharge opening when said device is closed, said top inclined surface generally continuously inclined from a front edge to a rear edge with said rear edge higher than said front edge, and said top inclined surface moving away from the discharge opening when the device traverses the discharge opening.

2. A device as described in claim 1, wherein said door assembly includes a top door panel forming said top inclined surface and two door side rails, said door side rails disposed generally parallel to each other and below lateral sides of said top panel and aligned longitudinally in a traveling direction of said door assembly, and said frame assembly supporting said door assembly along said side rails.

3. A device as claimed in claim 2, wherein said door assembly includes spaced transverse cross members beneath and attached to said top door panel and also attached to said door side rails, said top door panel is a generally flat plate, and said cross members supporting said top door panel in said door assembly.

4. A device as claimed in claim 2, wherein said door side rails include a flat bottom surface adapted to be supported by said frame assembly.

5. A device as claimed in claim 4, wherein said door side rails are elongated angle beams with one flange extending laterally outward from said door assembly and parallel to the plane coincident with the discharge opening.

6. A device as claimed in claim 1, further comprising a shaft assembly adapted to open and close said door assembly, said shaft assembly including a single shaft connected to at least two straps, said straps being connected to said door assembly.

7. A device as claimed in claim 6, wherein said door assembly includes a rear structure, said at least two straps include at least one front strap and one rear strap, said front strap directed forward and connected with a front of said door assembly to pull open said door assembly, and said rear strap directed rearward and connected to said rear structure of said door assembly to pull close the door assembly.

8. A closure trap device for containing and releasing granular material from a generally vertical discharge opening of a hopper, comprising a frame assembly including a generally rectangular framework surrounding the periphery of the discharge opening and having a generally vertical framework discharge opening, said framework further including rails extending parallel to a plane coincident with the framework discharge opening, a door assembly reciprocally supported by said rails for travel in one direction to close said framework discharge opening and contain the material and in an opposite direction to open said framework discharge opening and release the material, said framework rails including rollers reciprocally supporting said door assembly, and a flexible belt drive assembly mounted on said frame assembly for positively moving said door assembly between said closed condition and said open condition.

9. A device as claimed in claim 8, wherein said rollers are rotatably journalled on an interior side of said frame side rails.

10. A device as claimed in claim 8, wherein said frame side rails each include a frame side rail extension having rollers supporting said door assembly as it travels to and from a position with the discharge opening being completely open.

11. A device for opening and shutting off a discharge opening located on the bottom of a hopper on a vehicle, comprising a door assembly, a frame assembly supporting said door assembly for reciprocating travel in a forward direction to shutoff the discharge opening and in a rearward direction to open the discharge opening, and a drive assembly including one shaft and at least two windable elements operatively connected to cause said door assembly to reciprocatingly travel in said frame assembly by rotating said shaft and shortening one of said windable elements, said shaft including a longitudinal trough and a guide bushing adapted to securely connect an end of said windable element to said shaft over said trough.

12. The device as claimed in claim 11, wherein said guide bushing includes a retaining pin, two side collars concentric with said shaft, and a tightening screw threaded through in each of said side collars, said trough being at least as long as said retaining pin and said retaining pin fitting atop said end of said windable element over said trough, an end of each of said tightening screws in each said collar located in contact over said retaining pin, and tightening of said tightening screws exerting pressure on to said retaining pins to squeeze said end of said windable element into said groove to securely connect said windable element to said shaft.

13. The device as claimed in claim 11, wherein said strap guide bushing includes side walls that guide said strap to overlap when wound onto said shaft.

14. A device for opening and shutting off a discharge opening located on the bottom of a hopper on a vehicle, comprising a door assembly, a frame assembly supporting said door assembly for reciprocating travel in a forward direction to shutoff the discharge opening and in a rearward direction to open the discharge opening, and a drive assembly including one shaft and at least two windable elements operatively connected to cause said door assembly to reciprocatingly travel in said frame assembly by rotating said shaft and shortening one of said windable elements, said shaft including a longitudinal trough and said shaft assembly includes a guide bushing adapted to securely connect an end of said windable element to said shaft over said trough, said at least two windable elements being at least one opening windable element operative to pull said door assembly rearward to open the discharge opening by rotation of said shaft in one direction, and at least one closing windable element operative to pull said door assembly forward to close said discharge opening by rotation of said shaft in a reverse direction.

15. The device as claimed in claim 14, wherein said opening windable element is connected to a front portion of said door assembly, said door assembly includes a door rear structure, and said closing windable element is connected to said rear structure.

16. A device for opening and shutting off a discharge opening located on the bottom of a hopper on a vehicle, comprising a door assembly, a frame assembly supporting said door assembly for reciprocating travel in a forward direction to shutoff the discharge opening and in a rearward direction to open the discharge opening, and a drive assembly including one shaft and at least two windable elements operatively connected to cause said door assembly to reciprocatingly travel in said frame assembly by rotating said shaft and shortening one of said windable elements, said shaft including a longitudinal trough and said shaft assembly includes a guide bushing adapted to securely connect an end of said windable element to said shaft over said trough, said frame assembly including two substantially parallel frame side rails that support said door assembly at its lateral sides as it reciprocatingly travels, and a discharge opening framework that surrounds a periphery of the discharge opening, said door assembly including a door rear structure with a door rear rail, and said shaft of said drive assembly being supported by said frame assembly generally perpendicular to said parallel frame side rails and located rearward from said discharge opening framework and forward of said door rear rail.

17. The device as claimed in claim 16, wherein said at least two windable elements include at least one opening windable element directed in the forward direction and connected near a front portion of said door assembly, and at least one closing windable element directed in the rear direction and connected to said door rear rail.

18. The device as claimed in claim 17, wherein said door assembly travels between said substantially parallel side rails and includes a front door bracket for each opening strap, said front bracket extending outward of an adjacent frame side rail to provide an attachment point for said opening strap laterally outward from said adjacent side rail, and said opening strap extending between said shaft and said front bracket laterally outwardly from said adjacent frame side rail.

19. The device as claimed in claim 18, wherein said door assembly includes a top inclined surface that is inclined upwardly toward the discharge opening in the rearward direction from a plane of travel of said door assembly, and said inclined surface opens and shuts off said discharge opening when said door assembly travels.

20. A device as claimed in claim 8, wherein said belt drive assembly is supported by said rails above said reciprocating door assembly.

21. A device as claimed in claim 8, wherein said belt drive assembly includes a shaft assembly adapted to open and close said door assembly, said shaft assembly including a single shaft connected to at least two straps, one of said straps being connected to a forward portion of said door assembly and said other strap being connected to a rear portion of said door assembly for reciprocating movement of said door assembly upon rotation of said shaft assembly in opposite directions.

22. A device as claimed in claim 8, wherein said door assembly includes a generally flat inclined top surface from front-to-rear such that said rear is higher than said front and said top inclined surface moves away from said framework discharge opening when the door assembly moves in the opening direction and a generally flat horizontal bottom surface riding on said rollers.

23. A closure trap device for containing and releasing granular material from a generally vertical hopper, comprising a frame assembly having a generally vertical discharge opening, a generally horizontal door assembly supported in said frame assembly for reciprocating travel in one direction to shut off said discharge opening and in an opposite direction to open said discharge opening, and a flexible belt drive assembly mounted on said frame assembly for moving said door assembly between said shut and open conditions, said flexible belt drive assembly spaced vertically higher than said door assembly.

24. A device as claimed in claim 23, wherein said horizontal door assembly is supported for reciprocating travel on plastic wheels mounted in said frame assembly.

25. A device as claimed in claim 23, wherein said belt drive assembly includes a single drive shaft connected to at least one drive belt for moving said door assembly.

26. A device as claimed in claim 23, wherein said door assembly includes a generally flat inclined top surface from front-to-rear such that said rear is higher than said front and said top inclined surface moves away from said framework discharge opening when the door assembly moves in the opening direction and a generally flat horizontal bottom surface riding on said rollers.

27. A closure trap device for containing and releasing granular material from a generally vertical discharge opening of a hopper, comprising a frame assembly including a generally rectangular framework surrounding the periphery of the discharge opening and forming a generally rectangular framework discharge opening, said framework including rails and a door assembly reciprocally supported by said rails for travel in one direction to close said framework discharge opening and contain the material in the hopper and in an opposite direction to open said framework discharge opening and release the material from the hopper, a belt drive assembly for moving said door assembly between said closed and open conditions supported on said frame assembly, and inwardly inclined skirts supported along each edge of said framework discharge opening to direct the discharge of material from the hopper through the framework discharge opening without interfering with operational components for said reciprocating door assembly.

28. A device as claimed in claim 27, wherein said door assembly is supported by plastic rollers mounted interiorly of said rails and seals are mounted on said framework adjacent said door assembly to seal said framework discharge opening when said door assembly is in said closed condition, and said inclined skirts are positioned to direct the discharge of material from the hopper away from said wheels and seals.

29. A device as claimed in claim 27, wherein said belt drive assembly is supported by said rails above said reciprocating door assembly.

30. A closure trap device for containing and releasing granular material from a generally vertical discharge opening of a hopper, comprising a frame assembly surrounding the periphery of the discharge opening and having a generally vertical framework discharge opening, said frame assembly further including rails extending parallel to a plane substantially coincident with the framework discharge opening, a door assembly reciprocally supported by said rails for travel in one direction to close said framework discharge opening for containing said material and in an opposite direction to open said framework discharge opening for releasing said material, and a drive assembly including a power-driven rotating shaft and a flexible moving means driven by said rotating shaft and connected to said door assembly for moving said door assembly between said open position and said closed position, said rotating shaft and said flexible moving means both supported by said frame assembly above said door assembly.

31. A device as claimed in claim 30, wherein said door assembly includes a generally flat inclined top surface which moves away from said framework discharge opening when the door assembly moves in the opening direction and moves toward said framework discharge opening when the door assembly moves in the closing direction.

32. A device as claimed in claim 30, wherein said flexible moving means includes at least one belt-type element which moves said door assembly along said rails.

33. A device as claimed in claim 32, wherein said flexible moving means comprises at least a pair of belt-type elements in the form of straps, one of said straps being connected to a forward portion of said door assembly and said other strap being connected to a rear portion of said door assembly for reciprocating movement of the door assembly upon rotation of said rotating shaft in opposite directions.

34. A device as claimed in claim 30, wherein said door assembly is reciprocally supported on plastic wheels rotatably mounted on said rails.

* * * * *